Dec. 10, 1963  R. A. BOYD  3,113,728
ARTIFICIAL LIGHT AND DAYLIGHTING STRUCTURE
Filed June 24, 1960  4 Sheets-Sheet 1

INVENTOR.
ROBERT A. BOYD
BY *W. A. Schaich &
E. J. Holler*
ATTORNEYS

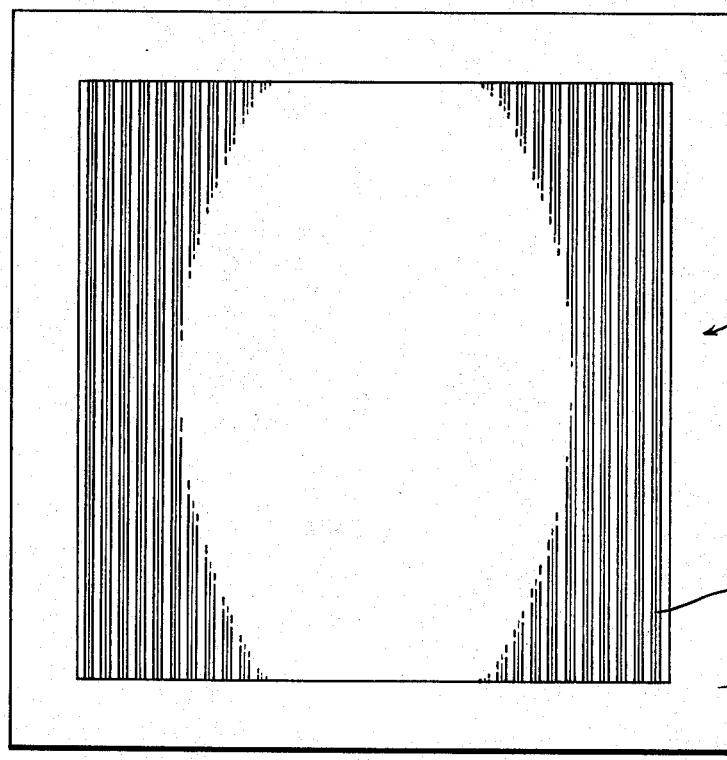
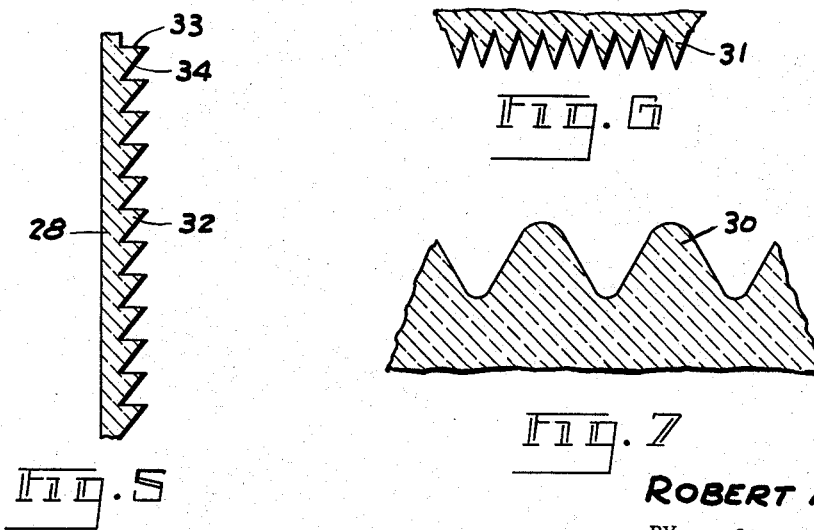

Dec. 10, 1963 R. A. BOYD 3,113,728
ARTIFICIAL LIGHT AND DAYLIGHTING STRUCTURE
Filed June 24, 1960 4 Sheets-Sheet 3

INVENTOR.
ROBERT A. BOYD
BY W. A. Schaich &
E. J. Holler
ATTORNEYS

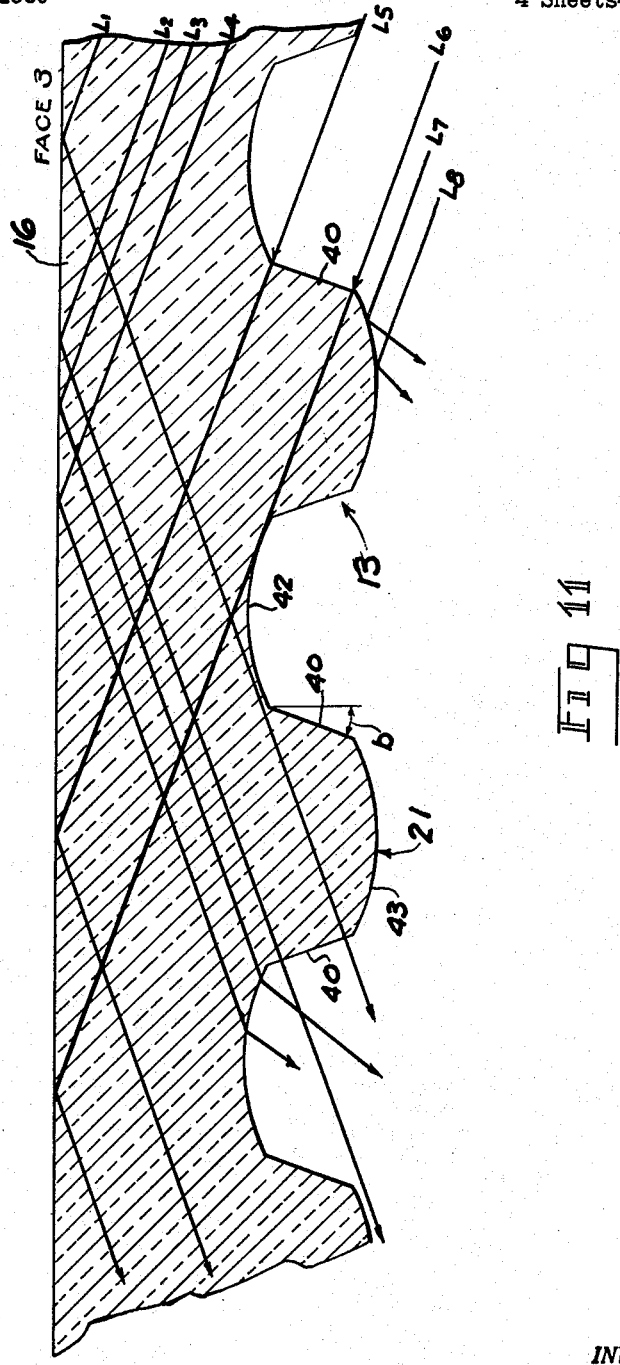

United States Patent Office

3,113,728
Patented Dec. 10, 1963

3,113,728
ARTIFICIAL LIGHT AND DAYLIGHTING STRUCTURE
Robert A. Boyd, Ann Arbor, Mich., assignor to Owens-Illinois Glass Company, a corporation of Ohio
Filed June 24, 1960, Ser. No. 38,598
10 Claims. (Cl. 240—9)

This invention relates to a structure for utilizing artifical light and daylight to light an interior.

In recent years, daylighting structures have been developed for use in an opening on a ceiling to light an interior. Such structures utilize prisms of predetermined configuration to control the light which enters through the opening and are shown in Patents 2,812,690 and 2,812,691 which have been issued to me. Very satisfactory results are achieved by such structures. It has been customary to provide artificial lighting fixtures in spaced relationship to such structures to illuminate the interior during the night hours. In such arrangements the opening containing the daylighting structure may appear dark and unattractive during the night hours. This condition is further aggravated when the daylighting structure is provided in the upper end of a well in the ceiling.

It is an object of this invention to provide a combined artificial light and daylighting structure which efficiently illuminates the interior during the day hours by utilizing daylight and during the night hours by utilizing artificial light.

It is a further object of this invention to provide such a structure which is pleasing in appearance to a viewer in the interior of the room both during the day hours and the night hours.

It is a further object of this invention to provide such a structure which is unitary and may be prefabricated prior to being placed in position in the ceiling of the room which is to be lighted.

In the drawings:

FIG. 4 is a plan view on an enlarged scale looking upwardly at a portion of the structure shown in FIG. 3.

FIG. 5 is a fragmentary sectional view on an enlarged scale of a portion of the structure shown in FIG. 3.

FIG. 6 is a fragmentary sectional view on an enlarged scale of a portion of the structure shown in FIG. 3.

FIG. 7 is a fragmentary sectional view on an enlarged scale of a portion of the structure shown in FIG. 3.

FIG. 11 is a fragmentary sectional view on an enlarged scale of a portion of the structure shown in FIG. 8.

Figure 1:
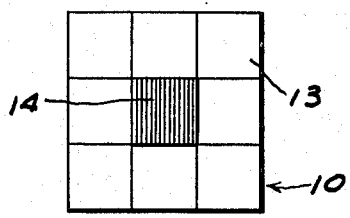
FIG. 1 is a plan view looking upwardly toward a prefabricated panel embodying the invention.

Referring to FIG. 1, according to the invention a prefabricated panel 10 is positioned in an opening 11 in the ceiling of a room. Panel 10 comprises a plurality of blocks 13 and an artificial light unit 14. Blocks 13 comprise spaced parallel walls 15, 16 of light-transmitting material joined by end walls 17 (FIG. 3) such as are found in a glass block of conventional construction. Blocks 13 are preferably of the type shown in my Patents 2,812,690 and 2,812,691 and include prisms 18 on the interior of wall 15 which function to reject sunlight from intermediate altitude angles and to transmit sunlight from low altitude angles and light from the north. The blocks 13 also include light-diffusing ribs 21 on the surface of the wall 16 which is adjacent the interior of the room.

Blocks 13 are preferably square and artificial lighting unit 14 has the same general dimensions so that lighting unit 14 is mounted in the prefabricated panel in the position normally taken by a block 13. The prefabricated panel may be made in any desired manner as shown in the patent to Richards 2,099,534. Panel 10 may comprise intersecting supporting strips 19 on which blocks 13 and lighting unit 14 are supported and mortar 20 filling the space between adjacent blocks 13 and between blocks 13 and lighting unit 14.

Figure 3:
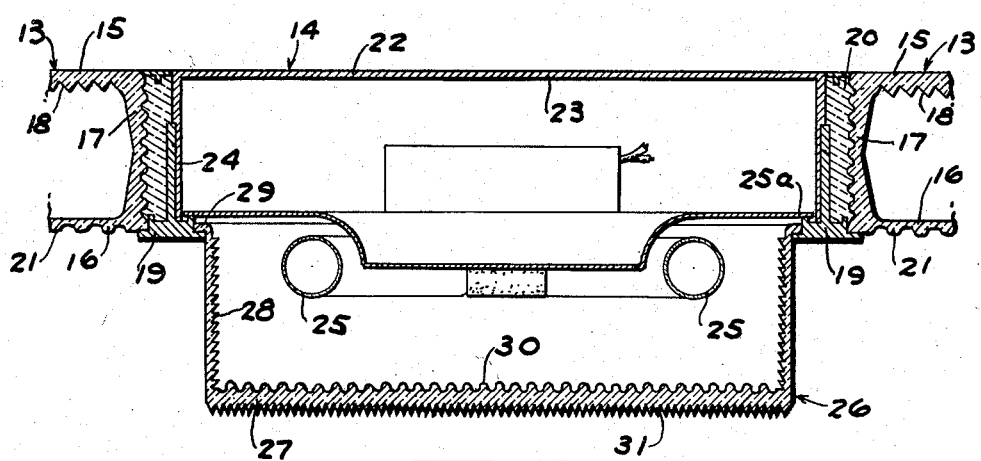
FIG. 3 is a fragmentary sectional view on an enlarged scale taken along the line 3—3 in FIG. 2.
Figure 8:
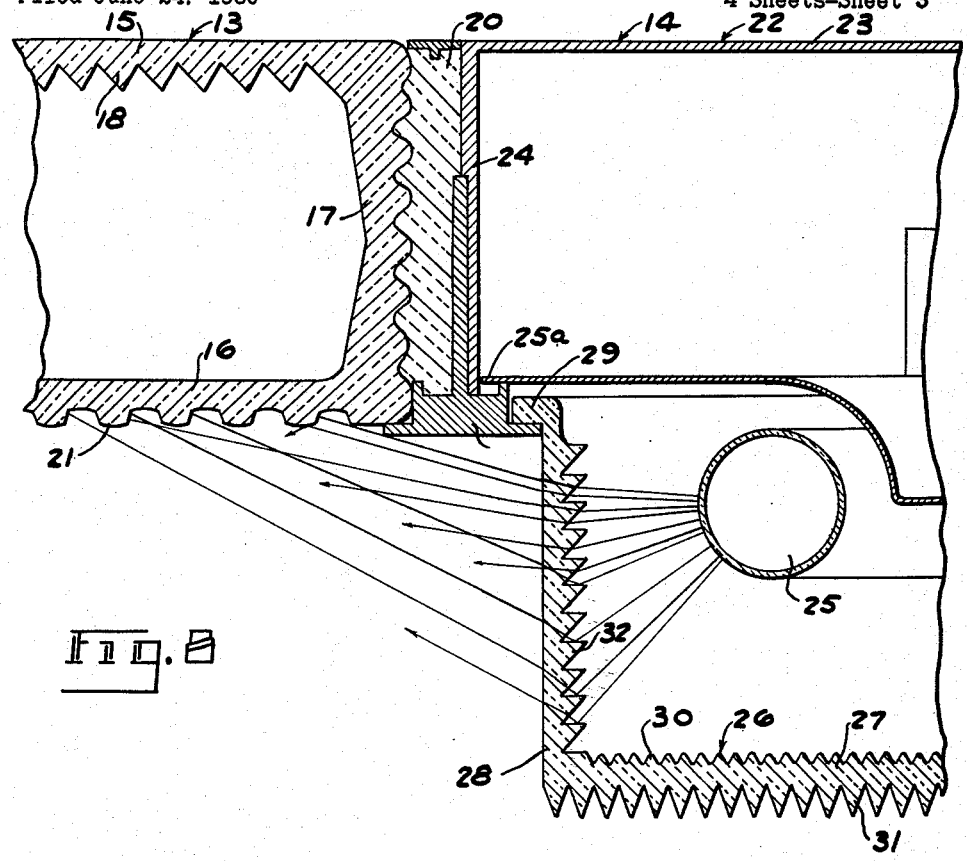
FIG. 8 is a fragmentary sectional view on an enlarged scale showing the path of light rays striking a portion of the panel shown in FIG. 3.

Referring to FIG. 3, artificial lighting unit 14 comprises a housing 22 of opaque material having substantially the same dimensions as blocks 13. Housing 22 comprises a top wall 23 and side walls 24, the lower ends of the side walls resting on supporting strips 19. A source 25 of artificial light such as a circular fluorescent tube may be supported on housing 22 or, as shown in FIGS. 3 and 8, may have a reflector, the periphery 25a of which rests on strips 19. A closure 26 of light-transmitting material such as translucent plastic or glass is provided below housing 22 and closes the opening in the lower end of the housing. Closure 26 includes a bottom wall 27, side walls 28 and a peripheral flange 29 extending outwardly from the upper end of side walls 28 and resting on a ledge on supporting strips 19.

As shown in FIGS. 3, 4 and 8, the interior surface of wall 27 is provided with parallel ribs 30. The exterior surface of wall 27 is formed with parallel diffusing prisms 31 (FIGS. 3 and 6). Side walls 28 of closure 26 are formed on their interior surface with parallel horizontal prisms 32. Prisms 32 are preferably triangular in cross section. Each prism 32 includes a substantially horizontal top surface 33 and an inclined bottom surface 34, the included angle between the surfaces 33 and 34 preferably being approximately 40° (FIG. 5).

In use, blocks 13 function during the daylight hours in the usual fashion to illuminate the interior as more fully described in the aforementioned Patents 2,812,690 and 2,812,691.

During the night hours sources 25 of artificial light are energized and cause light to be transmitted through closure 26 to illuminate the interior of the room. In addition, light is directed, because of the position of the closure below the plane of the lower walls 16 of blocks 13, toward lower walls 16 of blocks 13 which are nearest the interior of the room illuminating these surfaces and preventing these surfaces from presenting a dark and unsightly appearance to a viewer in the interior of the room.

The direction of the artificial light toward the blocks is facilitated by prisms 32 on wall 28 of closure 26 as shown in FIGS. 3 and 8. Prisms 32 direct some of the light rays upwardly toward the surfaces of the blocks 13.

As shown in FIG. 11, the ribs on face 4 of the block 13 preferably extend with their axes parallel to the side walls 28 of the closure 26. Ribs 21 are preferably symmetrical and comprise side surfaces 49, which form an angle $b$ with a plane which is vertical or normal to the plane of wall 16, connected by concave valleys 42 and convex apexes 43. The radius of curvature of the valleys 42 and apexes 43 is such that the valleys and surfaces are only slightly curved. The width of ribs 21 is preferably greater than the thickness. The angle $b$ is preferably about 20 degrees in order that light emanating at approximately 20 degrees from the horizontal form walls 28 will be redirected toward the interior of the room. It can be noted that light rays emanating from the wall 28 in directions above the horizontal are redirected to the interior. Some light rays $L_1$ to $L_6$ are refracted to the interior of face 3 and thereafter are reflected and refracted through the valleys 42 or surfaces 40. Other light rays $L_7$, $L_8$ are reflected to the interior directly by the apexes 43. By this arrangement, the light rays emanating from the artificial source and directed toward the wall 16 are redirected to the interior.

By this arrangement, not only is the dark and unsightly appearance of the blocks eliminated but, in addition, the blocks cooperate with the artificial lighting unit to more effectively illuminate the interior by redirecting light into the interior.

Figure 2:
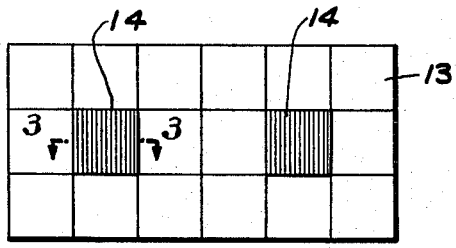
FIG. 2 is a view similar to FIG. 1 of a modified form of panel embodying the invention.

As shown in FIG. 2, various arrangements of lighting units and blocks may be provided, it being preferred for best results that a row of blocks be provided around the entire periphery of each lighting unit.

Figure 9:
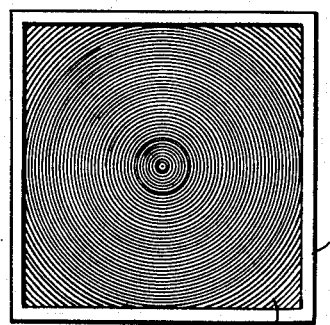
FIG. 9 is a plan view looking downwardly on a modified form of the invention.
Figure 10:
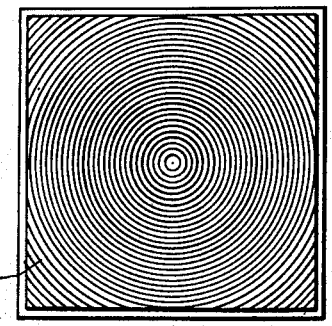
FIG. 10 is a plan view looking upwardly on the modified form of the invention shown in FIG. 9.

A modified form of the invention is shown in FIGS. 9 and 10 wherein bottom wall 35 of closure 36 is provided with concentric annular ribs 38 on the interior surface of the bottom wall and concentric annular prisms 39 on the exterior surface of the bottom wall. This form of the invention operates in substantially the same way as the previously described form except that a more uniform distribution of light is achieved to the interior of the room because of the annular ribs and prisms on the bottom wall of the closure.

I claim:

1. In a daylighting structure, the combination comprising a ceiling of a room having an opening therethrough exposed to the exterior through which daylight from the exterior passes, a plurality of light-transmitting units positioned in said opening, some of said units being made entirely of light-transmitting material through which daylight may pass from the exterior to the interior of the room, said latter units having light-diffusing means on a surface thereof adjacent the interior, at least one of said units comprising a source of artificial light and a closure of light-transmitting material mounted below said source, said closure having means thereon for directing some of said artificial light toward the diffusing means on said latter light-transmitting units in such a manner that said artificial light is redirected by said light diffusing means toward the interior of the room, whereby said light-transmitting units transmit daylight during the daylight hours and diffuse artificial light from the artificial light unit during the night hours.

2. In a daylighting structure, the combination comprising a room having a ceiling having an opening therethrough exposed to the exterior through which daylight from the exterior passes, a plurality of light-transmitting units positioned in said opening, some of said units comprising vertically spaced parallel sheets made entirely of light-transmitting material through which daylight may pass from the exterior to the interior of said room, one of said sheets of each said latter unit nearest the interior having light-diffusing ribs on the surface thereof nearest the interior, at least one of said units comprising a source of artificial light and a closure of light-transmitting material mounted below said source, said closure having means thereon for directing some of said artificial light toward the diffusing means on said sheets of light-transmitting material in such a manner that said artificial light is redirected by said light diffusing means toward the interior of the room, whereby said light-transmitting units transmit daylight during the daylight hours and diffuse artificial light from the artificial light unit during the night hours, said light-transmitting closure comprising a bottom wall and side walls, said bottom wall being formed with light-diffusing means thereon, said side walls being formed with said means for directing light toward the surface of said sheets of light-transmitting material of said light-transmitting units.

3. The combination set forth in claim 2 wherein said directing means on said side walls of said closure comprise prisms the axes of which extend generally horizontally.

4. The combination set forth in claim 3 wherein said prisms are generally triangular in cross section, the top surface of each said prism being horizontal and the bottom surface of each said prism forming an included angle of approximately 40° with the top surface.

5. In a daylighting structure, the combination comprising a room having a ceiling having an opening therethrough, exposed to the exterior through which daylight from the exterior passes, a plurality of blocks made entirely of light-transmitting material positioned in said opening, each said block comprising vertically spaced parallel sheets of light-transmitting material extending generally horizontally, an artificial light unit mounted among said blocks in spaced relation to the periphery of said opening in said ceiling by said blocks, said artificial light unit comprising a top cover of opaque material, a source of artificial light, and a closure of light-transmitting material mounted below said source, said sheets having means thereon for diffusing light from the artificial light unit.

6. The combination set forth in claim 5 wherein said light-transmitting closure of said artificial light unit is provided with prisms for directing some of the artificial light toward the surfaces of the sheets of the glass blocks which are nearer the interior.

7. In a daylighting structure, the combination comprising a room having a ceiling having an opening therethrough exposed to the exterior through which daylight from the exterior passes, a prefabricated panel comprising a plurality of blocks and at least one artificial light unit, said panel being positioned in said opening, each said block comprising vertically spaced parallel sheets made entirely of light-transmitting material through which daylight can successfully pass to the interior of the room, the sheets of said blocks which are nearest the interior lying in a common plane, said artificial light unit comprising a housing of opaque material of substantially the same dimensions as one of said blocks, said housing being open at the bottom, a closure of light-transmitting material closing the bottom of said housing, and an artificial light source positioned within said housing and closure, said closure projecting downwardly below the plane of said sheets of said blocks which are nearest the interior, said closure having light-directing prisms thereon for directing light toward the sheets of said glass blocks which are nearer the interior.

8. The combination set forth in claim 7 wherein said light-directing prisms are on an interior surface of said closure.

9. The combination set forth in claim 8 wherein said closure is formed with ribs on an interior surface thereof and diffusing prisms on an exterior surface thereof.

10. The combination set forth in claim 7 wherein said light-transmitting closure comprises a bottom wall and side wall, said prisms being formed on the interior surface of said side wall and extending generally horizontally, said bottom wall of said closure being formed with a plurality of concentric annular ribs on the interior surface thereof, and a plurality of concentric annular prisms on the exterior surface thereof.

References Cited in the file of this patent

UNITED STATES PATENTS

| | | |
|---|---|---|
| 2,232,543 | Logan | Feb. 18, 1941 |
| 2,273,748 | Adler | Feb. 17, 1942 |
| 2,398,507 | Rolph | Apr. 16, 1946 |
| 2,474,341 | Wince | June 28, 1949 |
| 2,601,127 | Rosenstein | July 17, 1952 |
| 2,675,466 | Baker | Apr. 13, 1954 |
| 2,768,556 | Boyd | Oct. 30, 1956 |
| 2,812,690 | Boyd | Nov. 12, 1957 |
| 2,812,691 | Boyd | Nov. 12, 1957 |
| 2,844,998 | Vicent | July 29, 1958 |